3 Sheets—Sheet 1.
C. A. & L. K. WILLIAMS.
Machine for Shearing Metal.
No. 215,780. Patented May 27, 1879.
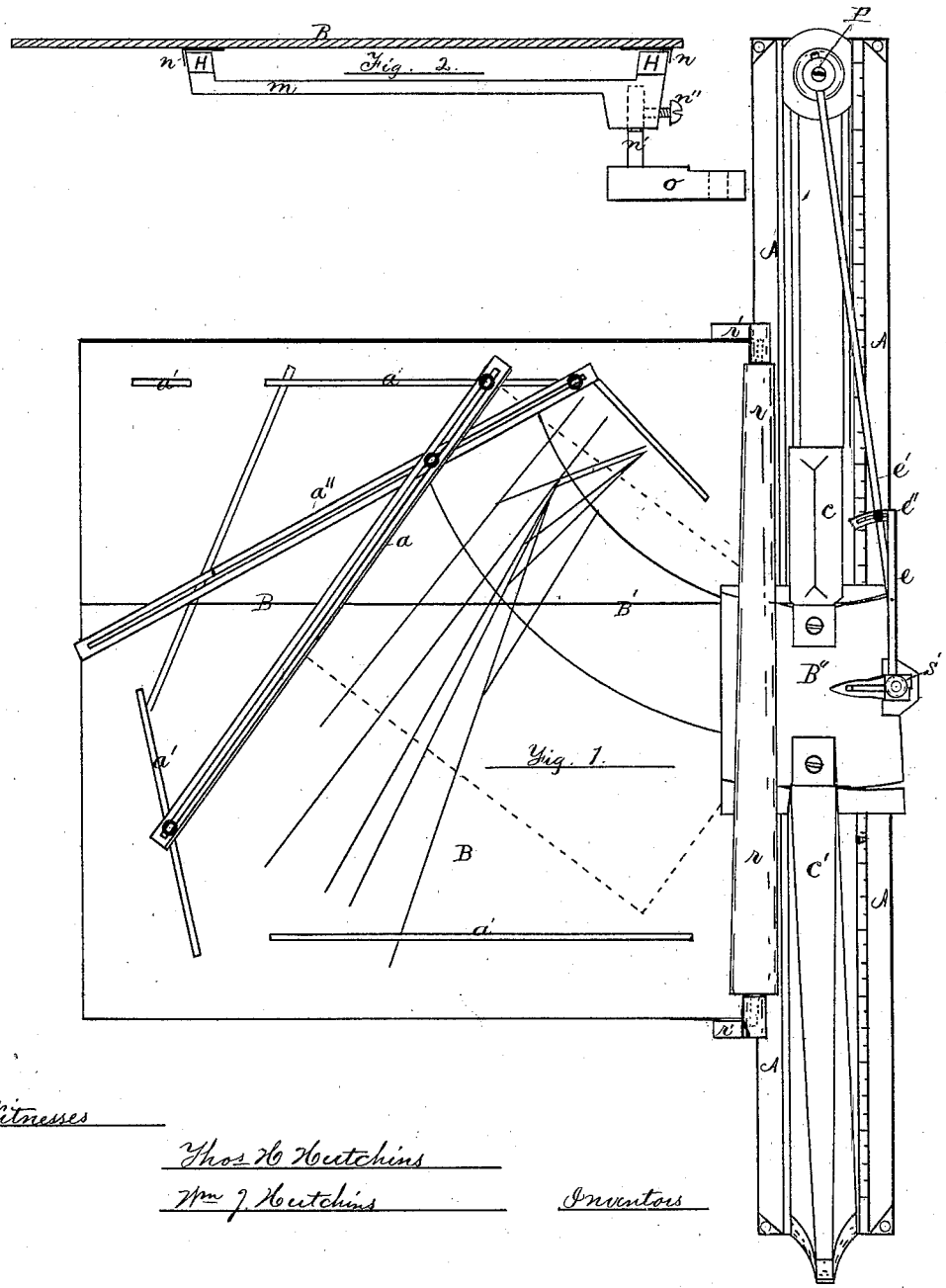
Witnesses
Thos. H. Hutchins
Wm. J. Hutchins
Inventors
Charles A. Williams
Levi K. Williams 3 Sheets—Sheet 2.
C. A. & L. K. WILLIAMS.
Machine for Shearing Metal.
No. 215,780.  Patented May 27, 1879.
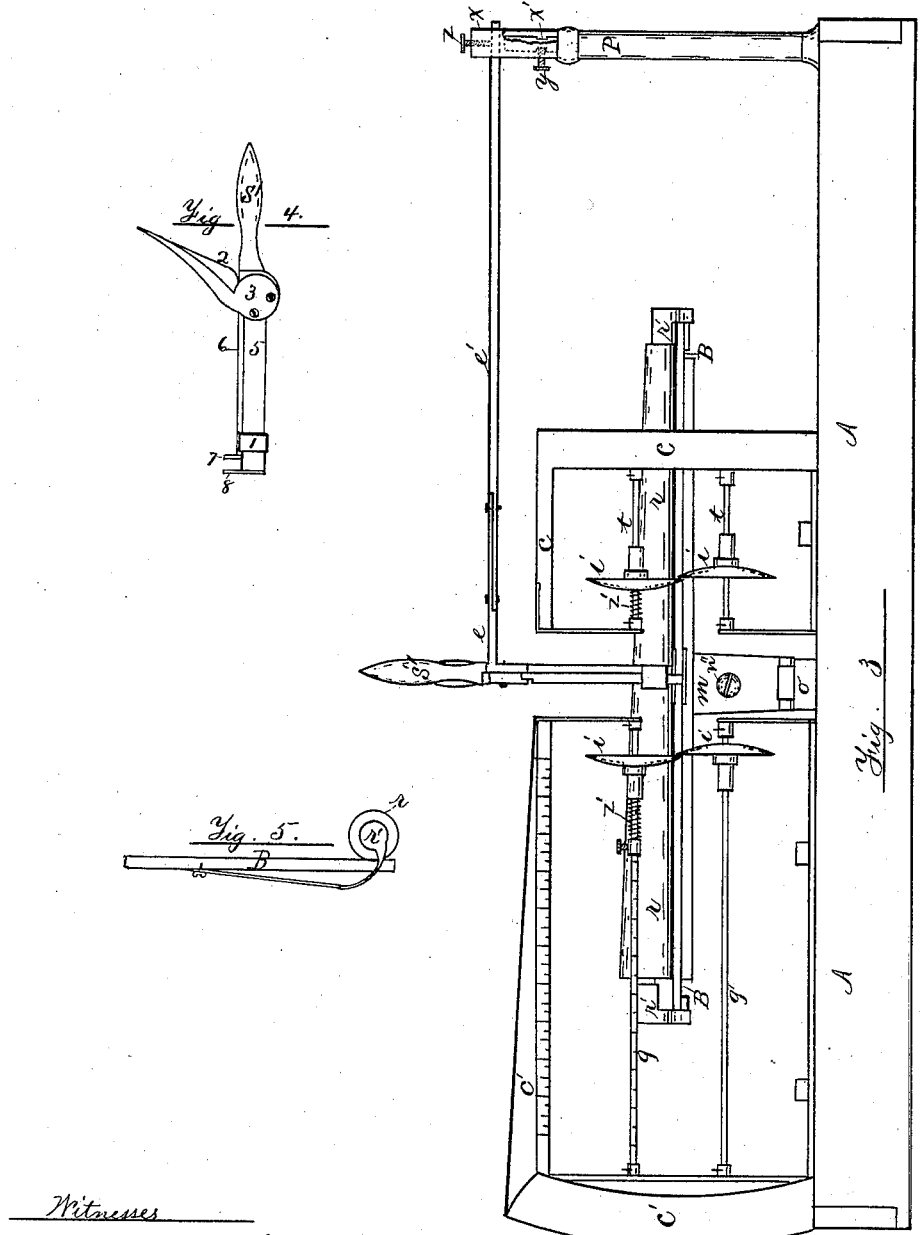
Witnesses
Thos. H. Hutchins
Wm. J. Hutchins
Inventors
Charles A. Williams
Levi K. Williams 3 Sheets—Sheet 3.
C. A. & L. K. WILLIAMS.
Machine for Shearing Metal.
No. 215,780. Patented May 27, 1879.
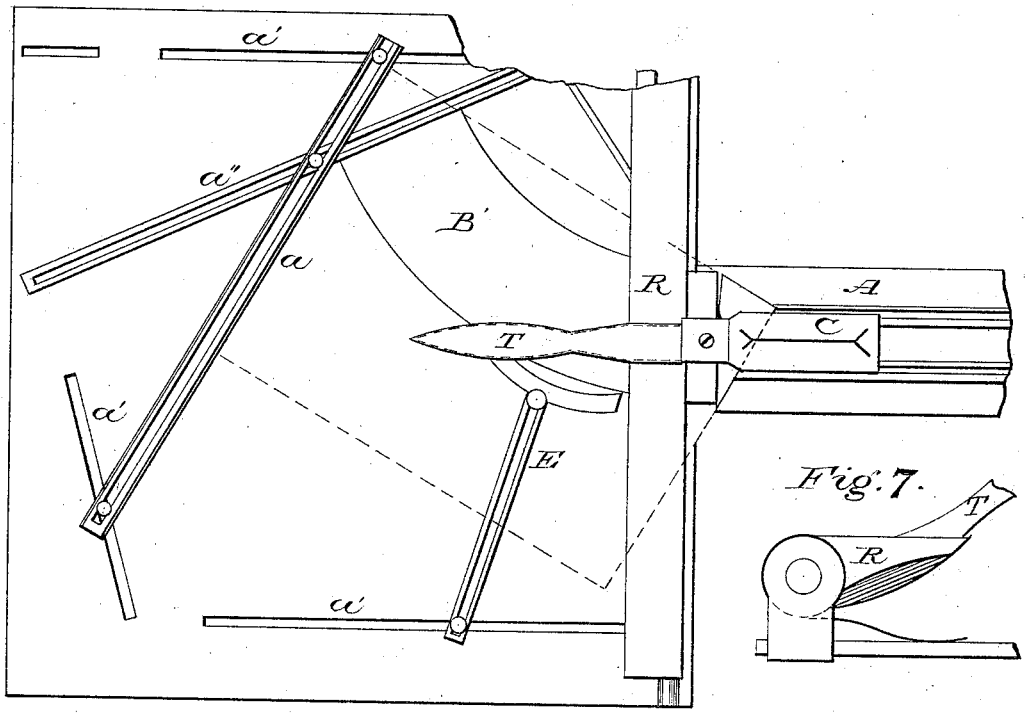
Witnesses:
Thos H Hutchins
Wm J Hutchins
Inventors.
Charles A Williams
Levi K Williams

UNITED STATES PATENT OFFICE.

CHARLES A. WILLIAMS AND LEVI K. WILLIAMS, OF JOLIET, ILLINOIS.

IMPROVEMENT IN MACHINES FOR SHEARING METAL.

Specification forming part of Letters Patent No. 215,780, dated May 27, 1879; application filed June 24, 1878.

*To all whom it may concern:*

Be it known that we, CHARLES A. WILLIAMS and LEVI K. WILLIAMS, of the city of Joliet, in Will county and State of Illinois, have invented a certain Machine for Cutting the Flared Sides of Tin Vessels, the description and operation of which we will proceed to explain, reference being had to the annexed drawings and the letters and figures thereon, making a part of this specification, in which—

Figure 1 is a plan view; Fig. 2, a longitudinal sectional view through the center of the table B; Fig. 3, a side elevation; Fig. 4, a side elevation of the hand-clamp; Fig. 5, an end view of a portion of the table B, showing the spring holding the roller $r$; Fig. 6, a second plan view, and Fig. 7 an end view of the clamp R.

The nature of the invention consists in the construction of a machine to cut the flared sides of a metal vessel at one operation, by means of passing the metal between rotary shears, without having to mark the shape out by a pattern, as in the ordinary manner.

In order to fully and readily understand the construction and operation of the machine reference is made to the accompanying drawings and the letters and figures thereon.

In the drawings, A represents the main bed-plate of the machine, which has a central longitudinal slot, in which the working parts stand and operate.

In Fig. 1, which is a plan view of the machine, is shown the bed-plate A, supporting the arms $c$ and $c'$, with the pattern-table B at one side, which holds the piece of tin B' to be cut.

Fig. 3 also shows the arrangement of the arms $c$ and $c'$ on the bed-plate A, supporting the train of rotary shears $i$, arranged to turn loosely at any point along the rods $g$ and $g'$ and $t$.

The table B has, on its upper surface, lines drawn to designate at what particular place to set the gage $a$, against which to place the edge of the piece of tin represented by the dotted lines on said table B. B' represents the shape of the tin after it has been cut, it being a section of the side of a flared tin vessel, which may be of any width for the depth of the vessel, both segments of the circle, or both its edges being cut at once by the rotary shears as the piece is pulled through between them.

All the patterns for any size or shape to be cut are represented by the pattern-lines shown on the face of the table B, so that all that is required to cut the tin to any desired circle is to set the gage $a$ to the pattern-line desired, each line being marked to show the capacity of the vessel to be made from tin cut from that pattern, such as pints, quarts, gallons, &c., thus saving the necessity of having separate patterns in the shop for each piece desired.

The mode of operation is as follows: The piece of tin represented by the dotted lines on the table B, Fig. 1, out of which the segmental piece of tin B' for the side of the vessel is to be cut, is laid flat on the table B, with one of its corners under the tapered roller $r$, which hold it with the said corner at the commencement of the shorter circle drawn from the shears nearest the post P, which post represents the center of the circle, the opposite shear being set to regulate the width to be cut to make the depth of the vessel. The opposite edge of the piece of tin is placed against the gage $a$ in the proper position. The tin is then grasped by means of the hand-clamp S', which is attached to the outer end of the radial arm $e'$, and then the piece of tin to be cut is pulled through between the shears $i$, which cut out a piece of tin of the shape shown at B', Fig. 1.

The slots $a'$ in the table B are for the purpose of receiving the thumb-screws which pass through the gages $a'$, $a''$, and E, and through the said table in said slots, so that the gages may be set to any pattern-line on the table B.

The arm $e'$ radiates from the post P at the extreme end of the bed-plate A, as shown in Fig. 3, from an arbor, $x$, which sets on the pivot having an annular groove, $x'$, in which the set-screw $y$ operates to hold the arbor $x$ from slipping off. The radial arm $e'$ slides through the arbor $x$, and is held at any place by the set-screw $z$, so as to accommodate its end carrying the hand-clamp to any circle to which the tin is desired to be cut, making a longer or shorter circle, according to the size or flare of the vessel to be made, the post P being the center of the circle from which all circular lines are cut.

The radial arm $e'$ has hinged to its outer end a secondary arm, e, supporting the hand-clamp S', which arm e has a segmental radial slot at its end next the post P with a set-screw, as shown in Fig. 1, for the purpose of causing the clamp S' to face the piece of tin squarely to grasp it, as the tin is set at different angles to cut different circles for the various sizes or flares of vessels.

The details of the hand-clamp S' are shown more particularly in Fig. 4, and consist of lever 3, legs 5 and 6, and foot-clamps 7 and 8. By grasping the lever 3 and bringing it up parallel with the legs 5 and 6 it brings the two feet 7 and 8 together, so as to grasp any object between them.

The roller $r$ is tapered, as the longer side of the circular piece of tin to be cut, as it is being drawn through the machine, travels faster than the shorter side, and is held on the top of the table at the side next the shears by means of the spring-journals $r'$, as shown in Fig. 5.

The table B is attached to the bed-plate A by means of the block $o$ and post $n'$, and rests upon the beams H, supported by the frame $m$, as shown more particularly in Fig. 2.

When it is desired to cut off the ends of the circular pieces of tin B' on the line radiating from the center of the circle, which is always at the post P, the arm $c'$ is taken off the machine, and the table is turned around to rest on the bed-plate A, parallel with it, as is shown in Fig. 6, the gage $a''$ forming the guide to hold the piece by; and as the piece is held firm by the long clamp R, (which is substituted in place of the roller $r$,) the table B is made to slide on the ways H, and the end of the piece is cut off, as is shown in Fig. 6.

The guide E assists in keeping the tin in proper position, which position is determined by the pattern-lines on the face of the table B.

The index-marks on the arms $c$ and $c'$, and also on the rods $g$ $g'$, are used to indicate how wide apart to set the shears $i$ to give the required height to the sheet of metal to be cut to make the vessel of any required capacity.

This device in a tinner's shop renders it quite unnecessary to keep a set of patterns for the various sizes of the flared parts of the sides of a tin vessel, or for any sized circular piece of tin, and is much more expeditious in its operations than any person can be with a pair of shears.

Having thus described our invention, what we claim as new, and desire to secure by Letters Patent, is as follows:

The combination and arrangement of the adjustable rotary shears $i$, pattern-table B, having lines representing patterns on its surface, slots $a'$, gages $a$ and E, radial arms $e$ and $e'$, and clamp S', all supported by the bed-plate A, for the purpose of cutting sheet metal in a segmental form without the use of other patterns than those indicated by the pattern-lines on the table B, for the purpose specified.

CHARLES A. WILLIAMS.
LEVI K. WILLIAMS.

Witnesses:
EDDIE C. WILLIAMS,
THOS. H. HUTCHINS.